(12) United States Patent
Gröning

(10) Patent No.: US 10,027,214 B2
(45) Date of Patent: Jul. 17, 2018

(54) OSCILLATING DRIVE COMPRISING SPIRALING YOKES

(71) Applicant: Wittenstein AG, Igersheim (DE)

(72) Inventor: Ingolf Gröning, Bad Mergentheim (DE)

(73) Assignee: Wittenstein SE, Igersheim (DE)

( * ) Notice: Subject to any disclaimer, the term of this patent is extended or adjusted under 35 U.S.C. 154(b) by 566 days.

(21) Appl. No.: 14/590,288

(22) Filed: Jan. 6, 2015

(65) Prior Publication Data

US 2015/0194869 A1 Jul. 9, 2015

(30) Foreign Application Priority Data

Jan. 9, 2014 (DE) .................. 10 2014 100 197

(51) Int. Cl.
*H02K 33/16* (2006.01)
(52) U.S. Cl.
CPC .................... *H02K 33/16* (2013.01)
(58) Field of Classification Search
CPC ...... H02K 33/16; H02K 1/2753; H02K 1/276; H02K 1/2766; H02K 1/2773; H02K 11/20; H02K 11/21; H02K 11/33
USPC .................. 310/36, 37–39, 156.47
See application file for complete search history.

(56) References Cited

U.S. PATENT DOCUMENTS

| 4,600,910 A * | 7/1986 | Vanderlaan | H01F 7/145 310/36 |
| 6,229,231 B1 * | 5/2001 | Ishida | H02K 33/16 310/36 |
| 7,714,466 B2 | 5/2010 | Kitamura et al. | |
| 8,446,571 B2 | 5/2013 | Fiess et al. | |
| 2003/0011252 A1 | 1/2003 | Langberg | |
| 2010/0165323 A1 | 7/2010 | Fiess et al. | |
| 2010/0283348 A1 * | 11/2010 | Okubo | H02K 1/278 310/156.47 |
| 2010/0301686 A1 * | 12/2010 | Takahashi | H02K 33/12 310/36 |

FOREIGN PATENT DOCUMENTS

| DE | 10260213 A1 | 6/2004 |
| DE | 102008055159 A1 | 7/2010 |

* cited by examiner

*Primary Examiner* — Michael Andrews
(74) *Attorney, Agent, or Firm* — Bachman & LaPointe, PC

(57) ABSTRACT

Oscillating drive (1), in particular for driving an output shaft (30) in a rotationally oscillating fashion, having an electric machine which comprises: a rotor (3) which can oscillate about a rotational axis (10) and which comprises a multiplicity of permanent magnet poles (5-8), a stator which comprises a circular winding (12) which is concentric with respect to the rotational axis.

8 Claims, 5 Drawing Sheets

OSCILLATING DRIVE COMPRISING SPIRALING YOKES

BACKGROUND OF THE INVENTION

The invention relates to an oscillating drive and a method for operating an oscillating drive.

Oscillating drives which can be used, for example, for hand-held tools (DE 102 602 13 A1) are known from the prior art. A further field of application of rotationally oscillating drives are laser scanner systems such as, for example, the system described in DE 10 2008 055 159 A1. Electric motors can be used for such rotationally oscillating drives. In this context there are drives which change the rotational direction of the motor or drives in which a continuous, rectified rotational movement of the motor is converted into an oscillating movement with a transmission.

In the case of rotationally oscillating drives which use a rotationally oscillating motor, high accelerations are important in order to change the rotational direction in the shortest possible time. In the motors used in the prior art, the design of high pulse flows is often delayed, which has a disadvantageous effect on the acceleration. However, in particular for laser scanners the highest possible accelerations are desirable in order to generate scanning rates which are as high as possible.

The object of the invention is to improve oscillating drives and methods for operating oscillating drives. In particular, oscillating drives are to be specified for driving, for example, a mirror of a laser scanner in a rotationally oscillating fashion, with which high accelerations for changing the direction or a high level of synchronization behavior are possible. A further object is to specify improved methods for actuating an oscillating drive.

SUMMARY OF THE INVENTION

An aspect of the invention is related to an oscillating drive, in particular for driving an output shaft in a rotationally oscillating fashion, having an electric machine, in particular transversal flux machine, wherein the electric machine comprises: a rotor which can oscillate about a rotational axis and which comprises a multiplicity of permanent magnet poles, a stator which comprises a circular winding which is concentric with respect to the rotational axis, wherein the stator has a multiplicity of yokes which at least partially engage around the winding, wherein the yokes are each oriented obliquely with respect to the axial direction.

A further aspect is related to a method for operating an oscillating drive according to embodiments described herein, comprising: energizing the winding with a current with a first direction, de-energizing the winding, energizing the winding with a current with a second direction which is opposed to the first direction, de-energizing the winding, and repeating the energization of the winding with a current with the first direction.

Typical embodiments of the invention do not comprise any spring arranged between the stator and the rotor. Hence, the rotor may rotate free of forces generated by springs such as rotational springs. Typical embodiments are free of rotational springs arranged between the rotor and the stator.

In typical embodiments of the invention, an electromagnetic transversal flux machine with a stator and a rotor is used. The transversal flux machine usually has a circular winding which is concentric with respect to the rotational axis of the rotor of the electric machine. The winding is of single-phase design in typical embodiments. This permits a simple design. In further embodiments, multi-phase windings are provided. The winding is typically arranged in a stator with U-shaped yokes which engage around the winding and which comprise claws in typical embodiments. This provides various advantages, for example copper losses in the winding heads which do not contribute to the formation of torque are eliminated and furthermore high accelerations can be achieved by virtue of the different arrangement and the winding which can be scaled independently of the direction of flow.

Typical embodiments of oscillating drives permit just one oscillating operation owing to the design. A rotational drive based on a transversal flux machine is disclosed in U.S. Pat. No. 7,714,466 B2. In contrast to the machine disclosed in this document, typical oscillating drives can, owing to the design, be operated only in a specific angular range, for example at maximum +/−90° around a central position. The angular range passed over is typically at maximum +/−40° or at maximum +/−30° or at maximum +/−25° or at maximum +/−15°. Typical embodiments of the invention can have, for example, end stops which are arranged in a positionally fixed fashion with respect to the stator and which are arranged in such a way that a rotational travel of the rotor is limited, for example to the angular details given above. This provides the advantage that the rotor cannot be placed in a position in which drive is no longer possible, for example because the rotor is precisely oriented with its permanent magnet poles in such a way that a magnetic field which is generated by the winding is not suitable to move the rotor. A further possible way of preventing a relatively large angular range being passed through by means of system technology is to provide a rotational travel sensor which is connected to a control device. The control device is configured to actuate the winding or supply it with current.

Typical control devices of embodiments can detect a position of the rotor when connected to a rotational travel sensor and can actuate the winding in such a way that the rotor carries out oscillating movements only within a predefined angular range. In embodiments, the control device is typically configured to actuate the winding in such a way that the rotor carries out an oscillating movement. For this purpose, the rotational angle position of the rotor can be detected via a rotational travel sensor in order to actuate the winding as a function of the detected rotational angle position. A further possibility is control without feedback in which feedback-free actuation of the winding takes place on the basis of the known mass and the known acceleration behavior of the rotor. In combination with an end stop which is arranged in a positionally fixed fashion with respect to the stator, such actuation provides the advantage that it is extremely simple and extremely reliable. Such feedback-free actuation can, moreover, also be used without end stops. When a rotational travel sensor is used, a closed-loop controller can be employed which actuates the winding in such a way that the rotor follows a predefined rotational travel. In a further embodiment of a closed-loop controller, there is merely interrogation as to whether the rotor passes through a specific position in order to set a defined current when this position is passed through. The defined current can be set for a defined time period or can be set until the rotor in turn passes through a specific different position or the same position, typically in the opposite direction. In this way, a reversal of the direction of rotation can be regulated at both ends with corresponding positions of the rotationally oscillating movement.

The stator is typically the only stator of the oscillating drive, or the winding is the only winding of the oscillating drive. Typical oscillating drives have precisely one stator. Furthermore, typical oscillating drives have precisely one winding. In further embodiments of oscillating drives, a multiplicity of stators or a multiplicity of windings are provided, for example in order to increase the flexibility. Embodiments with precisely one stator and precisely one winding provide the advantage of an extremely simple design.

The control device is typically configured in such a way that the winding is actuated, with the result that the rotor carries out an oscillating movement in an angular range which is smaller than the angular interval between two adjacent permanent magnet poles of the permanent magnet poles or is smaller than the distance between the respective centers of adjacent yokes. Typical rotors of oscillating drives of embodiments have a multiplicity of permanent magnet poles. These permanent magnet poles are distributed uniformly over the circumference of the rotor in typical embodiments. In further embodiments, the permanent magnet poles are distributed non-uniformly over the circumference, for example in order to achieve a relatively high acceleration in one of the two rotational directions. Permanent magnet poles which are distributed uniformly over the circumference provide the advantage of a simple design. In exemplary embodiments respectively opposed permanent magnet poles are arranged axially one behind the other or axially adjacent. This is suitable for an advantageous flux of the magnetic field, in particular with yokes which are oriented in axially straight fashion or yokes with claws which extend in an axially straight fashion between the winding and the rotor. Here, unless stated otherwise, the following terms are assumed: the soft-magnetic part of the stator which surrounds the coil is referred to as the "yoke", the part of the yoke which is located in the axial direction to the side of the coil is referred to as the "limb", the part of the yoke which extends in the axial direction between the rotor and the coil is referred to as the "claw", and the part of the yoke which is at a distance from the rotor in the radial direction behind the coil is referred to as the "yoke rear". In the embodiments, a multiplicity of yoke rears are embodied integrally with one another, and in further embodiments the yokes and the yoke rears are not embodied integrally but rather independently of one another. In further exemplary embodiments, the yoke rears are in multiple parts in the axial direction, for example in order to facilitate manufacture. The number of yokes over the circumference is typically at least two or at least three or four.

Typical rotational travel sensors of exemplary embodiments are arranged in order to detect an angular position of the rotor. The rotational travel sensor is typically connected to an input of the control device. In this way, the control device can interrogate a rotational angle of the rotor. Rotational travel sensors of exemplary embodiments can be configured differently. Typical rotational travel sensors can detect the angular position in small incremental steps, for example in 0.05° or 0.1° or 0.2° steps, further exemplary embodiments of rotational travel sensors merely comprise individual sensors at specific locations along the circumference of the stator in order to determine whether or not the stator assumes a specific angular position. In this way, a simplified design is possible.

Typical exemplary embodiments of oscillating drives comprise a multiplicity of yokes which engage around the winding. The yokes are typically distributed uniformly over the circumference of the stator. In typical embodiments, the number of permanent magnet poles of the rotor is equal to the number of yokes, or, for example, integral multiples of yokes compared to permanent magnet poles are present, or vice versa. This provides the advantage that the force of the electromagnetic field is generated repeatedly over the circumference and therefore the acceleration can be increased. In typical exemplary embodiments, the yokes are oriented in the axial direction. In further exemplary embodiments, the yokes are oriented obliquely with respect to the axial direction. The axial direction is here the direction of the rotational axis of the rotor. The yokes which are oriented obliquely with respect to the axial direction typically have a spiral shape. Typical exemplary embodiments comprise yokes which have over their length a winding, the passed-through angular range of which corresponds at least to 0.05 times or 0.1 times or 0.2 times the distance between two permanent magnet poles. Typical maximum angular ranges passed through are 0.7 times or 1.0 times the distance between two permanent magnet poles. Such twisting of the yokes provides advantages with respect to homogenization of the generation of torque and with respect to the generated magnetic fields and the accelerations brought about therewith, in particular in permanent magnet poles which do not change in the axial direction. In typical embodiments, the yokes or the claws of the yokes arranged between the winding and the permanent magnet poles taper in the axial direction. This provides the advantage that the motors are lighter in weight. Furthermore, typically only as much soft-magnetic yoke is installed, as is necessary to guide the flux. Furthermore, yokes typically engage around the winding from two sides. Such an arrangement is also shown, for example, in FIG. 3 of U.S. Pat. No. 7,714,466. In this context, yokes of a first group engage in each case around the winding from one side in the axial direction, and yokes of a second group engage around the winding in the opposite axial direction, wherein in each case a yoke of the first group is arranged next to a yoke of the second group. Numerous variants for yokes or claws which can be used in conjunction with embodiments described here are known from the prior art.

Typical methods of embodiments comprise energizing the winding with a current with a first direction and energizing the winding with a current with a second direction. The winding is typically de-energized between these two energization time periods for example for a specific time period or else until the rotor has reached a specific angular position. This is in each case dependent on the closed-loop or open-loop control methods used. The energization time periods with intermediate switching off are repeated, wherein in each case a repetition means one complete oscillation of the output shaft.

In typical methods, an angular position of the rotor is detected. With typical rotational travel sensors of embodiments, the angular position of the rotor is typically detected continuously. In further embodiments, the angular position of the rotor is detected only at defined positions, for example in the region of the central point. The energization with the current in the first direction or the energization with the current in the second direction is typically switched off as soon as the rotor has reached a respective predefined speed or respective predefined acceleration or respective predefined position. In this way, uniform continued rotation of the rotor after the acceleration is achieved. In further typical embodiments, the winding is not completely de-energized but is instead energized with a low current in order to compensate friction losses so that a constant speed is maintained. The de-energization with a current of zero provides the advantage that it is easy to implement. De-energization with connection of a small residual current, which is, for example, lower than 5% of the current during the energization time period or lower than 2% of the current during the energization time period provides the advantage that the movement can be made particularly uniform.

In order to detect the angular position of the rotor, typical methods use a rotational travel sensor which is connected to a control device.

In typical embodiments, the yokes are embodied with a width which is variable in the radial direction. The yokes typically taper inwards in the radial direction. This provides the advantage that the yokes have a lower utility factor since the same flux is conducted through a greater area. As a result, the magnetic drop in voltage is lower. At the same time, the distance between two flux-conducting yokes is always large, with the result that the variation is small.

The winding is protected against mechanical damage by the yokes which engage around the winding. Compared to conventional machines, in embodiments more copper can be introduced and therefore a high current-carrying capacity can be achieved. The scalability is given, in contrast to typical longitudinal machines, by virtue of the fact that the coil cross-sectional area can be enlarged without the area of the soft-magnetic region having to be consequently reduced automatically to a pole pitch. The optimum behavior of the coil cross-sectional area and iron cross-sectional area is dependent on the saturation curve of the soft-magnetic material used and on the thermal connection. As a result of the low-inductance design, pulsed currents can be fed in more quickly. The simple design of the embodiments makes the manufacturing costs low.

In embodiments, with an axial offset of the stator and rotor in conjunction with a concentric arrangement of the winding an axial force is generated when energization occurs. In particular in the case of changes to the acceleration, this results in an increase in the prestress of the bearings and slipping of the bearings is prevented. During the non-energized phase, the prestress of the bearings is low so that the bearings have only low friction. This brings about a high level of synchronous behavior and increases the service life of the bearings.

BRIEF DESCRIPTION OF THE DRAWINGS

Further advantages and features of preferred embodiments of the invention are explained below with reference to the appended drawings, in which.

DETAILED DESCRIPTION

Typical embodiments are described below with reference to the Figures, wherein the invention is not restricted to the exemplary embodiments but instead the scope of the invention is determined by the claims.

Figure 1:
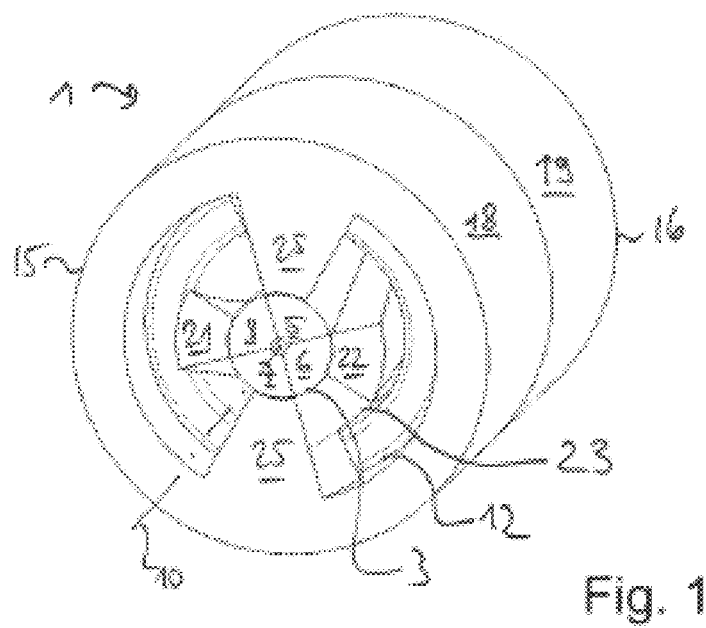
FIG. 1 shows a schematic perspective view of a typical embodiment of an oscillating drive.

FIG. 1 shows a schematic perspective view of a typical embodiment of an oscillating drive 1. The oscillating drive 1 comprises a rotor 3 which has a total of four permanent magnet poles 5, 6, 7 and 8. In typical exemplary embodiments and in the exemplary embodiment in FIG. 1, the permanent magnet poles are arranged in the circumferential direction, alternately as north poles and south poles.

In typical embodiments, the permanent magnet poles are formed by ring magnets. Further embodiments have individual magnets arranged on the rotor.

The permanent magnet poles 5 and 7 are south poles, and the permanent magnet poles 6 and 8 are north poles. The rotor 3 can rotate about a rotational axis 10. The oscillating drive 1 has a winding 12 concentrically with respect to the rotational axis 10. The winding 12 is the only winding of the oscillating drive 1.

The winding 12 is associated with a stator of the oscillating drive 1. The stator is the only stator of the oscillating drive 1 and comprises a plurality of parts, in particular a first housing part 15 and a second housing part 16. The two housing pats 15 and 16 in turn comprise various features, wherein the housing parts 15 and 16 are each formed in one piece. The housing parts 15 and 16 are identical. In order to form the stator, the housing parts 15 and 16 are arranged one on top of the other at their end sides, wherein the housing parts 15 and 16 are arranged mirror-inverted and rotated. Each of the housing parts 15 and 16 comprises claws 21 and 22 which are connected via limbs 25 to the cylindrical outer housing sections 18 and 19 of the housing parts 15 and 16. The outer housing sections 18 and 19 form here yoke rears of yokes which are each formed from a claw 21 or 22, a limb 25 and an associated yoke rear. The housing part 16 comprises claws 21 and 22 which are arranged obliquely with respect to the rotational axis 10 and on both sides of the rotational axis 10 and each wind around the rotor 3 through 90° along their length. In further exemplary embodiments, the claws pass through a relatively small angle. Of the first housing part 15, only one claw 23 can be seen in certain sections since the other claw (reference symbol 24 in FIG. 3 and FIG. 4) is concealed. Like the claws 21 and 22 of the housing part 16, the claws 23 (second claw of the first housing part 15 is not illustrated in FIG. 1) also winds through 90° along its length about the rotational axis 10 of the rotor 3.

Figure 2:
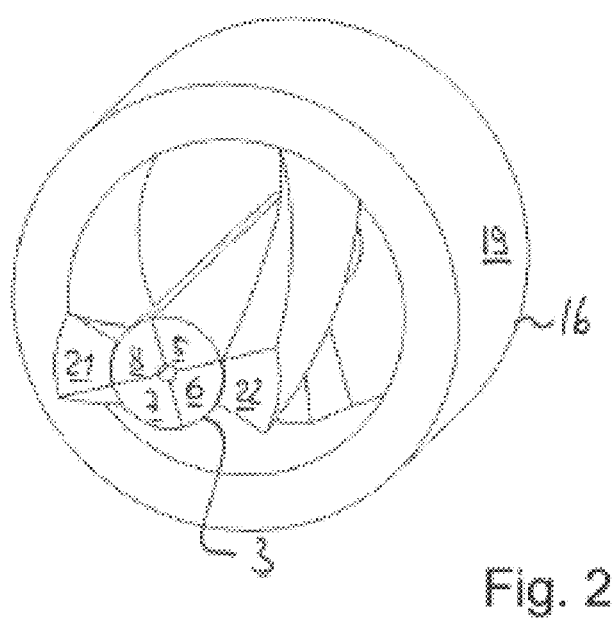
FIG. 2 shows a schematic perspective view of parts of the embodiment in FIG. 1.

For the sake of better comprehension, FIG. 2 shows only the second housing part 16 and the rotor 3 of the exemplary embodiment in FIG. 1 in a schematic perspective view. Since the same reference symbols denote identical elements, details on all the features are not given again at this point. However, it is to be noted that a limb 25 of the second housing part 16 can also be seen in FIG. 2. The limbs 25 are all of identical design and carry out identical functions, and the same reference symbol has therefore been used for the various limbs.

The better clarity in FIG. 2 also results from the fact that the winding (reference symbol 12 in FIG. 1) is not illustrated in FIG. 2.

Figure 3:
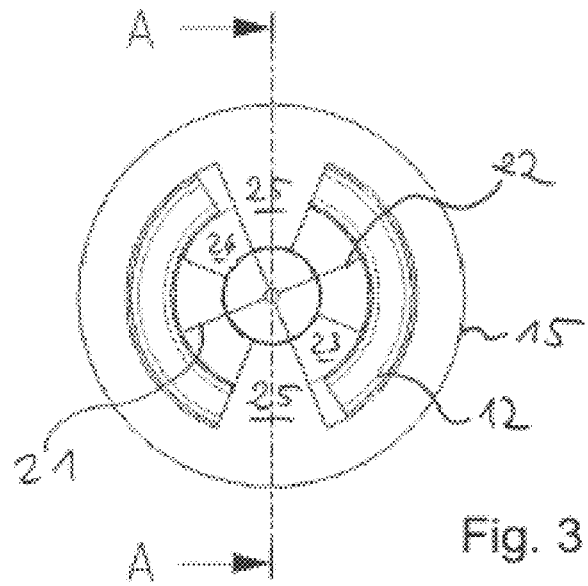
FIGS. 3 and 4 show sectional views of the typical embodiment of an oscillating drive in FIGS. 1 and 2.
Figure 4:
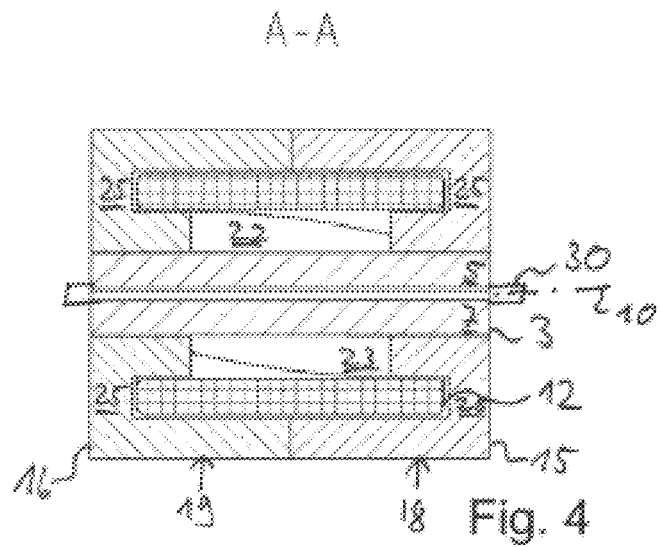

FIGS. 3 and 4 are sectional views of the typical embodiment of an oscillating drive 1 in FIGS. 1 and 2. The same reference symbols are used again for the same parts and are not fully explained once more. Furthermore, the claw 24 which is associated with the housing part 15 and which winds around the rotor 3 in the anticlockwise direction in FIG. 3 can be seen in the axial plan view in FIG. 3. Furthermore, an output shaft 30, with which, for example, a mirror of a laser scanner can be driven, is also illustrated in FIG. 4.

Figure 5:
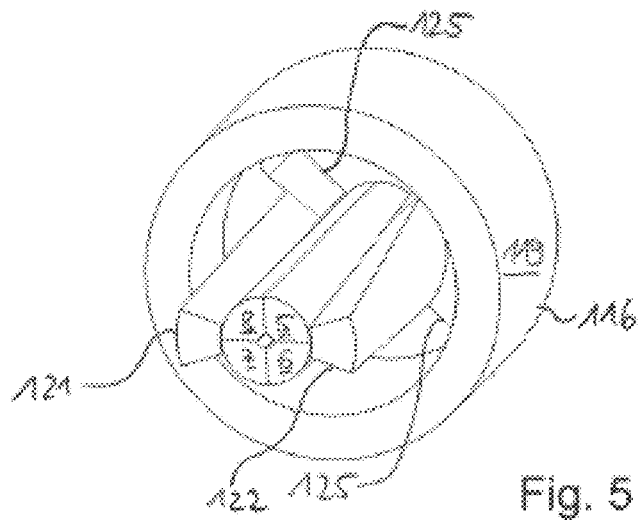
FIG. 5 shows a schematic perspective view of parts of a further typical embodiment of an oscillating drive.

FIG. 5 is a partial illustration of a further embodiment of an oscillating drive 101 (see FIG. 6) in a schematic perspective view. Only a rear housing part 116 of the embodiment of the oscillating drive 101 is illustrated in FIG. 5. Generally, in the description of FIGS. 5-7 the same reference symbols have been used for the same parts as in the description of FIGS. 1-4. In parts which are of a similar design, like parts in FIGS. 1-4, reference symbols have been used which are 100 higher than the respective reference symbols of the embodiment in FIGS. 1-4.

Therefore, the rear or second housing part 116 in FIG. 5 has, in comparison with the second housing part 16 of the embodiment in FIG. 2, straight claws 121 and 122 which are oriented in the axial direction and which engage around a rotor 3 with four magnet poles 5-8, again alternately north poles and south poles. The straight claws 121 and 122 are connected via limbs 125 to a cylindrical housing section 119 which forms a yoke rear. The claws 121 and 122 and the limbs 125 are of radially inwardly tapering design and the claws 121 and 122 also taper in the axial direction. A first or front housing part 115 and a winding 12, which are explained in conjunction with the following description in FIG. 6 and FIG. 7, are also required again for the entire oscillating drive 101.

Figures 6, 7:
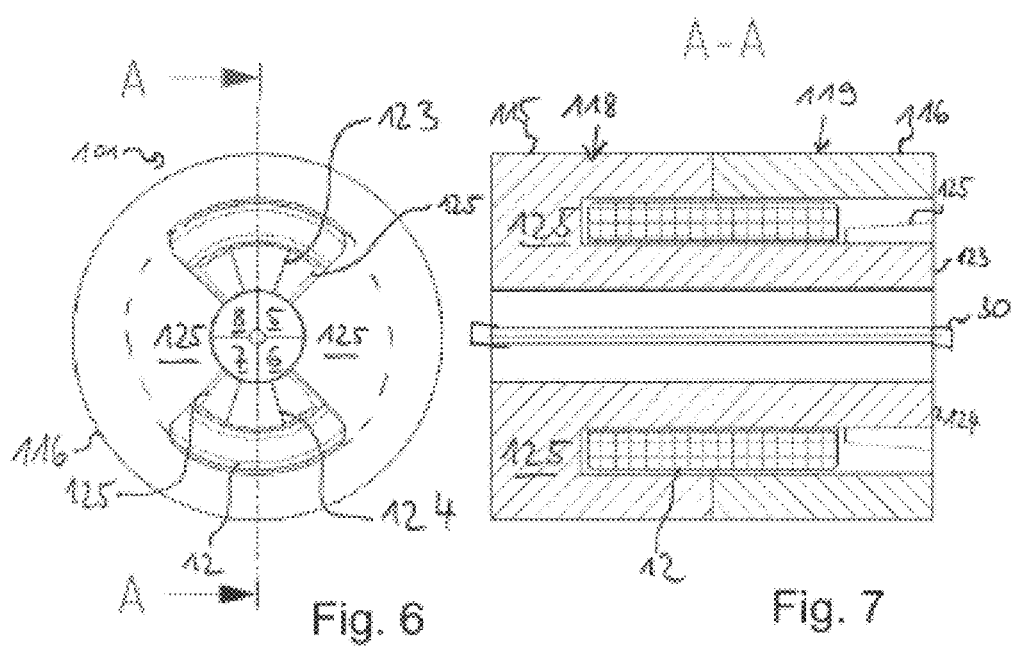
FIG. 6 shows an axial plan view of the exemplary embodiment of an oscillating drive which is illustrated partially in FIG. 5.
FIG. 7 shows a sectional view of an exemplary embodiment which is illustrated in FIG. 5 and FIG. 6.

FIG. 6 shows an axial plan view, and FIG. 7 a sectional view, of the exemplary embodiment of an oscillating drive 101, which is partially already illustrated in FIG. 5. FIG. 6 also shows, in addition to FIG. 5, a winding 12 around which the straight claws 121, 122 (see FIG. 5) and straight claws 123 and 124 engage. The claws 123 and 124 are part of a first housing part 115 (see also FIG. 7) and, like the claws 121 and 122, are of straight design in the axial direction and of tapering design relative to the circumference, in the axial direction. The claws 121 and 122, on the one hand, and the claws 123 and 124 on the other, therefore taper axially in opposite directions. Furthermore, FIG. 7 shows a sectional view, wherein FIG. 7 also shows an output shaft 30 which bears the rotor 3. The housing parts 115 and 116 have in turn cylindrical housing sections 118 and 119 which form yoke rears. In exemplary embodiments, the yoke-forming housing parts 115 and 116 can be welded. In exemplary embodiments, the yokes, yoke rears or housing parts are connected by welding, bonding, screwing, clamping from the outside or by shrink-fitting into a housing. This also applies analogously to other embodiments of oscillating drives, for example to the embodiment described in relation to FIGS. 1-4.

In embodiments, the claws or the yokes typically engage one in the other. In typical embodiments, the housing sections also form part of the yoke, for example the yoke rears, or constitute a structure for conducting the magnetic flux. In typical embodiments with yokes or claws which engage one in the other, the magnetic flux is conducted through the housing sections, the limbs, the yokes or claws to the permanent magnet poles.

Figure 8:
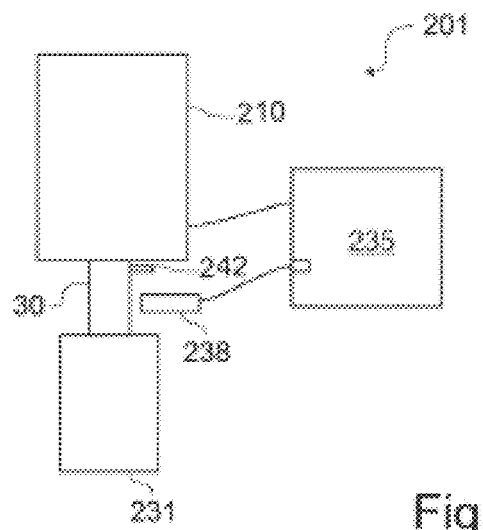
FIG. 8 shows a schematic view of an exemplary embodiment of an oscillating drive with a control device.

FIG. 8 shows an oscillating drive 201 with a control device. In this context, in particular the electric machine 210 of the oscillating drive 201, as has been described with reference to the exemplary embodiments in FIGS. 1-7, is shown in a highly schematic fashion. The electric machine 210 of the oscillating drive 201 can be of corresponding design to the exemplary embodiments in FIGS. 1-7.

The electric machine 210 is connected via an output shaft 30 to a mirror 231 of a laser scanner. The electric machine 210 is actuated by means of a control device 235. The control device 235 has an input which is connected to a rotational travel sensor 238. The control device 235 can determine the angular position of the output shaft 30 and therefore the angular position of the rotor of the electric machine 210 of the oscillating drive 201 by means of the rotational travel sensor 238. In order to ensure additional protection with respect to excessive rotation of the rotor of the oscillating drive, an end stop 242 is provided which restricts the freedom of movement of the rotor to such an extent that the rotor cannot get into a position in which it can no longer be driven by energizing the winding. The free space for a rotational movement between two end stops is smaller here than the angle between two adjacent permanent magnet poles. In further embodiments, the rotational travel sensor is mounted on the end of the output shaft lying opposite the mirror.

Figure 9:
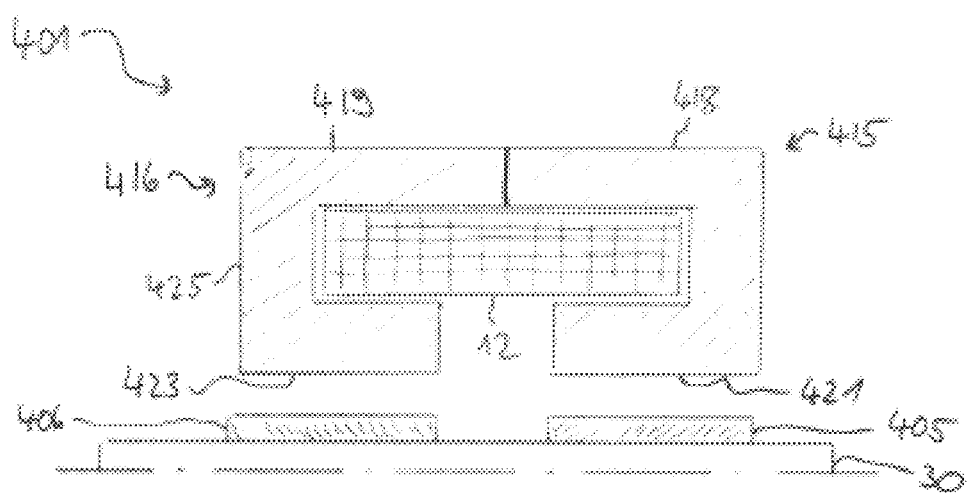
FIG. 9 shows a partial cross section through a further embodiment.

FIG. 9 shows an exemplary embodiment of an oscillating drive 401 in a partial sectional view, to be more precise a longitudinal section. The oscillating drive 401 in FIG. 9 comprises, like other embodiments, a winding 12, about which, however, a first straight claw 421 engages axially from a first side and a second straight claw 423 engages axially from a second side, in a longitudinal sectional plane. The claw 421 is part of a first housing part 415, and the second claw 423 is part of a second housing part 416. The housing parts 415 and 416 are connected to one another, in particular welded or screwed. Furthermore, an output shaft 30, which forms a rotor together with permanent magnets 405 and 406, is shown in FIG. 7. The housing parts 415 and 416 have cylindrical housing sections 418 and 419 which in turn form yoke rears.

The permanent magnets 405 and 406 of the exemplary embodiment in FIG. 9 have different poles in the plane of the drawing. In this way, it is possible to use claws which are oriented in a straight fashion in the axial direction instead of the oblique claws of other embodiments. The permanent magnets are arranged on the shaft or on the rotor in two circumferential groups. Each group is located here axially at the level of the respective associated yokes. In the circumferential direction, the poles of the two groups alternate in accordance with the angular position of the yokes. In this context, the two groups are arranged in such a way that in each case an opposing pole is present axially adjacent to the other group.

Figure 10:
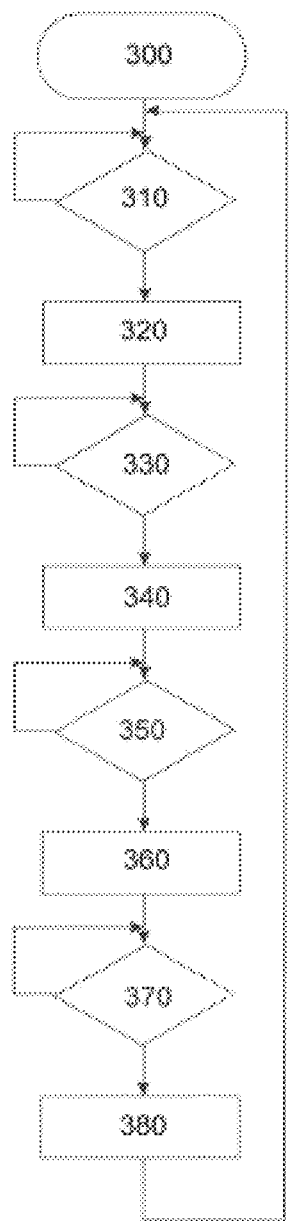
FIG. 10 shows the sequence of a method of typical exemplary embodiments in a schematic form.

The sequence of a typical method of embodiments is described below with reference to FIG. 10. It is possible, for example, to carry out the method with the embodiment in FIG. 8, wherein the control device is configured to carry out the method.

After a start of the method (300), the rotational travel sensor is interrogated as to whether the rotor has reached a position −x corresponding to −20° with respect to a central position of the rotor (block 310). As soon as the position −x has been reached, the method jumps to a block 320 at which the energization of the winding of the oscillating drive in a first direction is begun. This causes the rotor to accelerate with the output shaft counter to the original direction of movement, with the result that the rotor is firstly braked and then accelerated in the opposite direction. During the energization it is interrogated whether the rotor with the output shaft again reaches the position −x corresponding to −20° (block 330), now in the opposite rotational direction compared to the rotational direction in the case of block 310. As long as the position −x has not been reached, the energization is continued. The energization takes place here with a defined current in a current-controlled fashion, with the result that a constant acceleration is reached. When the position −x is reached, the method jumps to a block 340 in which the energization of the winding is deactivated. Subsequently, in a block 350 it is interrogated whether the rotor and the output shaft have reached a position +x corresponding to +20°. As soon as the position x corresponding to +20° has been reached, the method continues with energization of the winding in a second direction opposed to the first direction (block 360). As a result of the energization of the block 360, the rotor is now in turn initially braked with the output shaft and then accelerated again in the direction towards the central position between the two position marks −x and x. In turn, in a subsequent block 370 it is interrogated when the rotor and the output shaft in turn no longer overshoot the position x in the direction of the central position. As soon as this is the case, the energization is deactivated in a block 380.

In the case of methods of exemplary embodiments, the winding is de-energized at positions between the two end positions. In further exemplary embodiments, low energization of the winding is also performed between the end positions in order to bring about as far as possible uniform movement to prevent friction losses of the rotor and of the output shaft.

According to the step 380 and the de-energization of the winding which is associated therewith, the method begins in turn from the start, in which case the system waits until the rotor and the output shaft have reached the position −x. The method is continued as long as the oscillating drive is kept operational. In response to switching off, the method can be stopped in any of the described blocks, in which case it is, however, to be ensured that the rotor is prevented from moving into a position out of which it can no longer be accelerated. This may be implemented, for example, by means of an end stop of the shaft, as is illustrated schematically in FIG. 8. Further possibilities are suitable open-loop or closed-loop control methods for bringing the rotor to a standstill in a central position between the positions −x and x. Further typical methods use, for example, closed-loop control methods in which certain travel values are prescribed, with the result that the current is switched in such a way that the prescribed travel is complied with.

The invention claimed is:

1. Oscillating drive, having an electric machine, wherein the electric machine comprises:
   a rotor which can oscillate about a rotational axis and which comprises a multiplicity of permanent magnet poles,
   a stator which comprises a circular winding which is concentric with respect to the rotational axis,
   wherein the stator has a multiplicity of yokes engaging at least partially around the winding and being oriented obliquely and spiraling with respect to the axial direction, and further comprising
   a control device which is configured to actuate the winding in such a way that the rotor carries out an oscillating movement, wherein the control device is configured in such a way that the winding is actuated, with the result that the rotor carries out an oscillating movement in an angular range which is smaller than the angular interval between two adjacent permanent magnet poles of the permanent magnet poles.

2. Oscillating drive according to claim 1, wherein the stator is the only stator, and the winding is the only winding.

3. Oscillating drive according to claim 1, having a rotational travel sensor which is arranged to detect an angular position of the rotor, and which is connected to an input of the control device.

4. Oscillating drive according to claim 1, having an end stop which is arranged in a positionally fixed fashion with respect to the stator and which is arranged in such a way that a rotational travel of the rotor is limited.

5. Oscillating drive according to claim 1, wherein the yokes become wider in a direction radially outwards in the circumferential direction or taper radially inwards.

6. Oscillating drive according to claim 1, wherein the rotor is free of rotational springs.

7. Method for operating an oscillating drive according to claim 1, comprising:
   energizing the winding with a current with a first direction,
   de-energizing the winding,
   energizing the winding with a current with a second direction which is opposed to the first direction,
   de-energizing the winding, and
   repeating the energization of the winding with a current with the first direction.

8. Method according to claim 7, with continuing detection of an angular position of the rotor, wherein the energization with the current in the first direction and/or the energization with the current in the second direction are/is switched off as soon as the rotor has reached a respective predefined speed or respective predefined acceleration or respective predefined position.

* * * * *